US008218756B2

(12) United States Patent
Kee (10) Patent No.: US 8,218,756 B2
(45) Date of Patent: Jul. 10, 2012

(54) USER-CONTROLLABLE EQUALIZATION FOR TELEPHONY

(75) Inventor: Tommy Wing Chau Kee, Richmond (CA)

(73) Assignee: Broadcom Corporation, Irvine, CA (US)

( * ) Notice: Subject to any disclaimer, the term of this patent is extended or adjusted under 35 U.S.C. 154(b) by 908 days.

(21) Appl. No.: 11/972,447

(22) Filed: Jan. 10, 2008

(65) Prior Publication Data

US 2009/0180608 A1 Jul. 16, 2009

(51) Int. Cl.
*H04M 9/00* (2006.01)
*H04M 7/04* (2006.01)

(52) U.S. Cl. ..................................................... 379/398
(58) Field of Classification Search ................... 379/398
See application file for complete search history.

(56) References Cited

U.S. PATENT DOCUMENTS

| 6,381,469 | B1 * | 4/2002 | Wojick ......................... 455/550.1 |
| 8,041,025 | B2 * | 10/2011 | Dolph et al. ............. 379/390.01 |
| 2003/0065830 | A1 * | 4/2003 | Tung et al. ......................... 710/8 |
| 2003/0090739 | A1 * | 5/2003 | Yoshida ........................ 358/405 |
| 2006/0224051 | A1 * | 10/2006 | Teller et al. .................... 600/300 |

* cited by examiner

*Primary Examiner* — Alexander Jamal
(74) *Attorney, Agent, or Firm* — Fiala & Weaver P.L.L.C.

(57) ABSTRACT

A system, method and apparatus is described that permits a user to configure or select the manner in which an audio signal transmitted or received over a telephony system, such as a wideband telephony system, is shaped or equalized. An implementation of the present invention allows a user to configure or select equalization control parameters on a call-by-call basis. Furthermore, an implementation of the present invention allows a user to associate equalization control parameters with a party initiating a call and/or a party receiving the call, thereby facilitating automated equalizer adjustment at call connection based on an identification of the calling party and/or the called party.

21 Claims, 7 Drawing Sheets

USER-CONTROLLABLE EQUALIZATION FOR TELEPHONY

BACKGROUND OF THE INVENTION

1. Field of the Invention

The invention generally relates to telephony systems. In particular, the invention relates to the equalization of audio signals transmitted or received by telephony terminals within a telephony system.

2. Background

Traditional telephony systems, including analog systems such as POTS (Plain Old Telephone Service) systems and digital systems such as ISDN (Integrated Services Digital Network) systems, carry audio signals in a narrowband fashion. In such systems, the audio signal is often digitized at a data rate of 64 kilobits per second (kbps) and may be compressed to a data rate of less than 64 kbps. As a result, signal quality and fidelity is compromised. Traditional narrowband telephony thus represents a compromise between intelligibility and data rates, providing an acoustic bandwidth of approximately 200 hertz (Hz) to 3.4 kilohertz (kHz).

Wideband telephony refers to transmitting audio signals with a bandwidth in the range of approximately 50 Hz to 7 kHz, effectively doubling the narrowband audio signal of traditional telephony. Compared to narrowband telephony, the low-frequency enhancement from 50 to 200 Hz has been observed to add a sense of presence, adding increased naturalness and comfort to conversations. The high-frequency extension from 3.4 kHz to 7 kHz provides better differentiation of certain consonants and therefore provides significantly improved intelligibility. Although wideband telephony was standardized for ISDN with the G.722 codec approximately 20 years ago, it never really enjoyed wide deployment.

However, with the recent introduction of Voice over Internet Protocol (VoIP) telephony systems and other packet telephony systems that support data rates of 128 kbps or even higher, wideband telephony is now becoming more widely available. New wideband telephony systems can advantageously permit the end-to-end transmission of high-fidelity audio signals at a quality comparable to compact disc (CD) quality or even better.

Since wideband telephony systems achieve significantly-improved signal clarity, it is anticipated that some users will want to adjust the audio output to their personal liking. For example, some users may wish to fine-tune the audio output to suit a personal preference in a like manner to users who adjust the audio output of a high-fidelity stereo system. Also, for psychological reasons, some users may want to make the audio output sound more like the audio output associated with traditional narrowband telephony systems. Still further, some users may want to adjust the audio output to compensate for ambient noise or other factors that may impact their perception of the audio output.

Many conventional telephony systems provide no mechanism for shaping or equalizing an audio signal. On the other hand, some conventional telephony systems provide filters for shaping an audio signal prior to transmission over the telephony network and/or after reception but prior to playback at the speaker. Such filters may be hardware-based or software-based. However, the settings associated with such filters are preconfigured for the telephony system and are not configurable or selectable by either the person placing or receiving the telephone call. Such settings are also not configurable or selectable on a call-by-call basis. For narrowband telephony systems, this is not a significant issue, since the audio signal quality and fidelity is already compromised and control over loudness is all that is really needed. However, for wideband telephony systems, the absence of such functionality may significantly impact the user experience.

What is needed then is a system, method and apparatus that permits a user to configure or select the manner in which an audio signal transmitted or received over a wideband telephony system is shaped or equalized. The desired system, method and apparatus should allow the user to configure or select equalization control parameters on a call-by-call basis. Furthermore, the desired system, method and apparatus should allow the user to associate equalization control parameters with a party initiating a call and/or a party receiving the call, thereby facilitating automated equalizer adjustment at call connection based on an identification of the calling party and/or the called party.

BRIEF SUMMARY OF THE INVENTION

A system, method and apparatus is described herein that permits a user to configure or select the manner in which an audio signal transmitted or received over a telephony system, such as a wideband telephony system, is shaped or equalized. An implementation of the present invention allows a user to configure or select equalization control parameters on a call-by-call basis. Furthermore, an implementation of the present invention allows a user to associate equalization control parameters with a party initiating a call and/or a party receiving the call, thereby facilitating automated equalizer adjustment at call connection based on an identification of the calling party and/or the called party.

In particular, a method for controlling equalization in a telephony terminal is described herein. In accordance with the method, input is received from a user. In response to receiving the user input, one or more equalization parameters are set. An audio signal received by the telephony terminal is then shaped based on the one or more equalization parameters. The method may further include receiving the audio signal from a microphone and transmitting the shaped audio signal over a transmission medium. Alternatively, the method may further include receiving the audio signal from a transmission medium and playing the shaped audio signal by a speaker. In either case, the audio signal may be a wideband audio signal and the transmission medium may be connected to or constitute part of a wideband telephony network.

The foregoing method may further include storing the one or more equalization parameters in association with a unique user identifier. This step may include storing the one or more equalization parameters and the associated unique user identifier locally with respect to the telephony terminal. Alternatively, this step may include uploading the one or more equalization parameters and the associated unique user identifier to a remote system within a telephony network. In either case, the one or more equalization parameters and the associated unique user identifier are then accessed during call setup to determine if a calling party has an identifier that matches the unique user identifier. If it is determined that the calling party has an identifier that matches the unique identifier, then the audio signal is shaped using the one or more equalization parameters. Alternatively, the one or more equalization parameters and the associated unique user identifier are accessed during call setup to determine if a called party has an identifier that matches the unique user identifier. If it is determined that the called party has an identifier that matches the unique identifier, then the audio signal is shaped using the one or more equalization parameters.

A telephony terminal is also described herein. The telephony terminal includes a user interface, equalizer control logic, and an equalizer. The user interface is configured to receive input from a user. The equalizer control logic is configured to set one or more equalization parameters responsive to the user input. The equalizer is configured to shape an audio signal received by the telephony terminal based on the one or more equalization parameters. The telephony terminal may also include a microphone configured to provide the audio signal and a telephony network interface configured to transmit the shaped audio signal over a transmission medium. Alternatively, the telephony terminal may also include a telephony network interface configured to receive the audio signal from a transmission medium and a speaker configured to play the shaped audio signal. In either case, the audio signal may be a wideband audio signal and the transmission medium may be connected to or constitute part of a wideband telephony network.

In accordance with the foregoing telephony terminal, the equalizer control logic may be configured to store the one or more equalization parameters in association with a unique user identifier. The equalizer control logic may perform this function by storing the one or more equalization parameters and the associated unique user identifier locally with respect to the telephony terminal. Alternatively, the equalizer control logic may perform this function by uploading the one or more equalization parameters and the associated unique user identifier to a remote system within a telephony network. The equalizer control logic may also be configured to access the one or more equalization parameters and the associated unique user identifier during call setup to determine if a calling party has an identifier that matches the unique user identifier. The equalizer may be configured to shape the audio signal based on the one or more equalization parameters responsive to a determination by the equalizer control logic that the calling party has an identifier that matches the unique identifier. Alternatively, the equalizer control logic may be configured to access the one or more equalization parameters and the associated unique user identifier during call setup to determine if a called party has an identifier that matches the unique user identifier. The equalizer may be configured to shape the audio signal based on the one or more equalization parameters responsive to a determination by the equalizer control logic that the called party has an identifier that matches the unique identifier.

A telephony system is also described herein. The telephony system includes a network system and a telephony terminal. The network system is configured to store one or more equalization parameters in association with a unique user identifier. The telephony terminal is configured to retrieve the one or more equalization parameters and the associated unique user identifier from the network system during call setup to determine if a calling party has an identifier that matches the unique user identifier. The telephony terminal is further configured to shape an audio signal received by the telephony terminal based on the one or more equalization parameters responsive to a determination that the calling party has an identifier that matches the unique identifier. The audio signal received by the telephony terminal may be received by a microphone. Alternatively, the audio signal received by the telephony terminal may be received from the telephony network.

An alternate telephony system is also described herein. The alternate telephony system includes a network system and a telephony terminal. The network system is configured to store one or more equalization parameters in association with a unique user identifier. The telephony terminal is configured to retrieve the one or more equalization parameters and the associated unique user identifier from the network system during call setup to determine if a called party has an identifier that matches the unique user identifier. The telephony terminal is further configured to shape an audio signal received by the telephony terminal based on the one or more equalization parameters responsive to a determination that the called party has an identifier that matches the unique identifier. The audio signal received by the telephony terminal may be received by a microphone. Alternatively, the audio signal received by the telephony terminal may be received from the telephony network.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example Operating Environment

Figure 1:
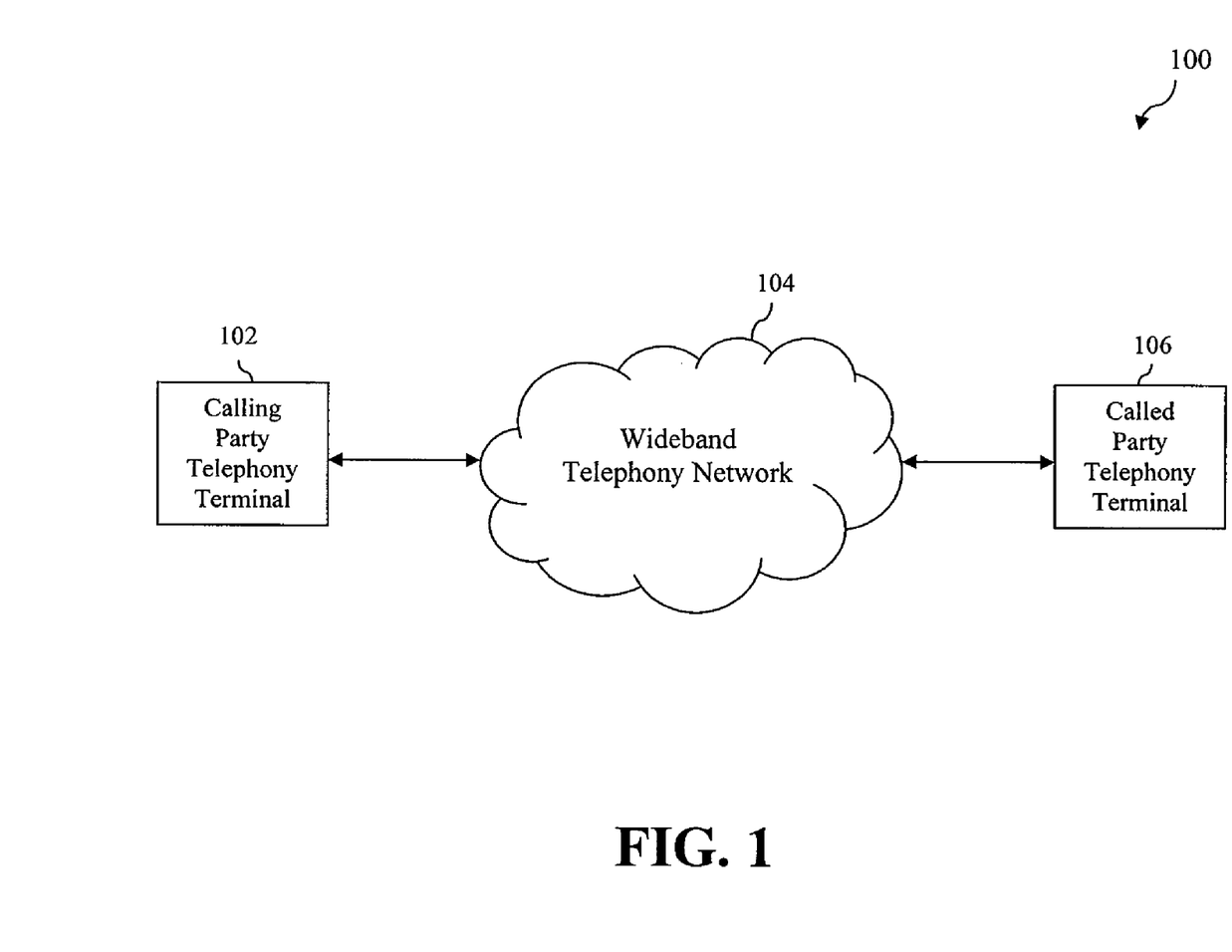
FIG. 1 is a high-level block diagram of a wideband telephony system in which an embodiment of the present invention may be implemented.

FIG. 100 is a block diagram of an example wideband telephony system 100 in which an embodiment of the present invention may be implemented. System 100 is described herein by way of example only. Based on the teachings provided herein, persons skilled in the relevant art(s) will readily appreciate that the present invention may also be implemented in other operating environments.

As shown in FIG. 1, system 100 includes a calling party telephony terminal 102 and a called party telephony terminal 104 that are communicatively connected to each other via a wideband telephony network 104. Wideband telephony network 104 is intended to represent any network capable of supporting telephonic communication of wideband audio signals, as discussed in the background section above. Wideband telephony network 104 may comprise, for example, a Voice over Internet Protocol (VoIP) telephony network or other packet-based telephony network.

Calling party telephony terminal 102 is intended to represent a telephony terminal from which a telephone call is placed while called party telephony terminal 104 is intended to represent a telephony terminal at which the telephone call is received. Each of telephony terminals 102 and 104 is configured to enable a user to place and receive telephone calls over a wideband telephony network and may be, for example and without limitation, a VoIP telephone, a desktop telephone, a mobile telephone, a wireless handset with headset attachments, a softphone, a speakerphone, a cordless telephone, a telephony-enabled personal digital assistant, or the like.

B. User-Controllable Equalization in Telephony Applications

During a telephone call between calling party telephony terminal 102 and called party telephony terminal 106, wideband audio signals are carried between the terminals by wideband telephony network 104 in a well-known manner. In accordance with an embodiment of the present invention, each of telephony terminals 102 and 104 may be configured to allow a user to adjust settings that determine the manner in which the wideband audio signals transmitted or received by the telephony terminals are shaped or equalized. This feature will be described in more detail below. Depending upon the implementation, this adjustment of the equalizer settings can occur before, during, or after a call is connected between the two terminals, or alternatively when no call is connected between the two terminals.

1. User Control of the Ingress Equalizer

Figure 2:
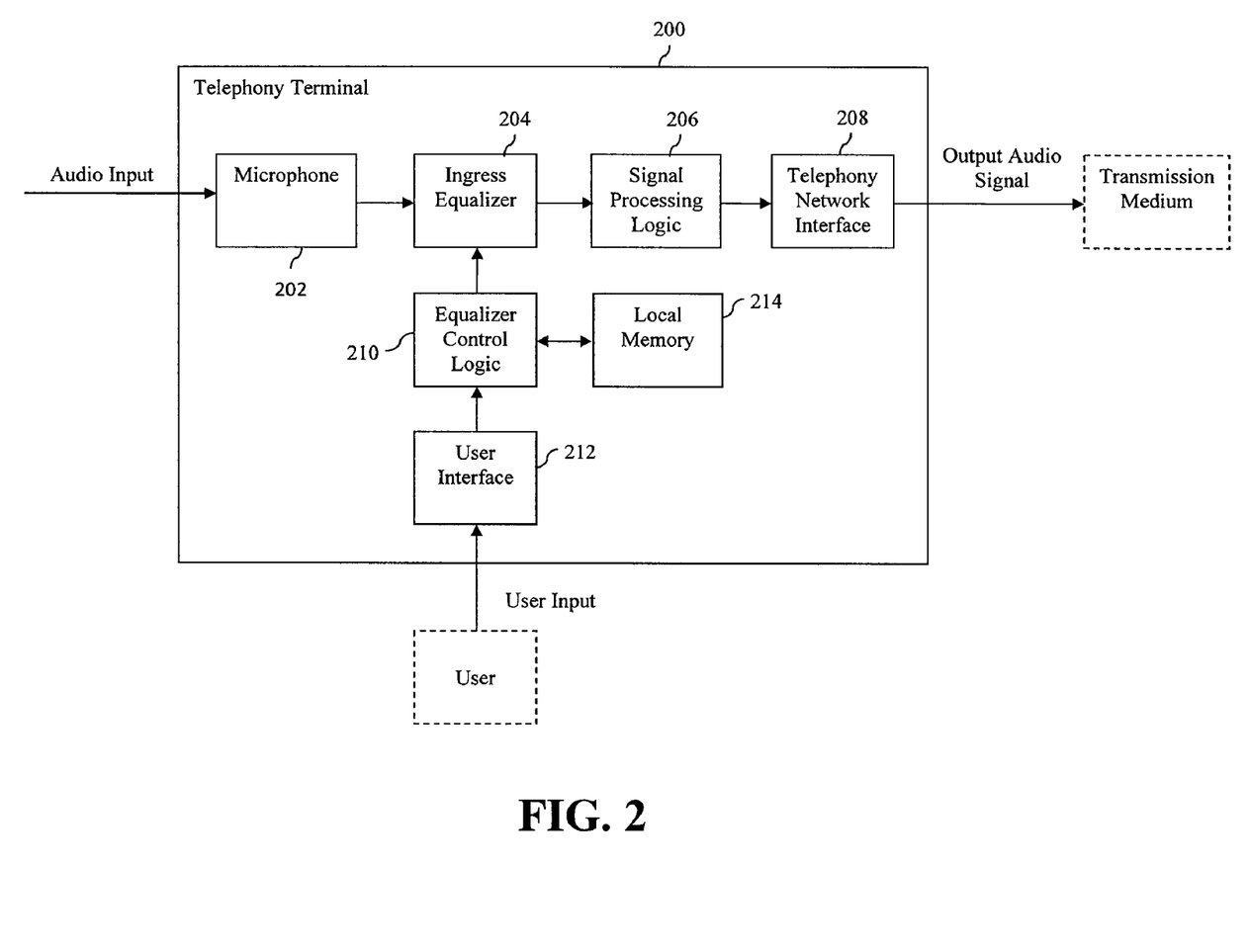
FIG. 2 is a block diagram of a telephony terminal that facilitates user control of an ingress equalizer in accordance with an embodiment of the present invention.

FIG. 2 is a block diagram of a telephony terminal 200 that facilitates user control of an ingress equalizer in accordance with an embodiment of the present invention. Telephony terminal 200 may be used, for example, to implement calling party telephony terminal 102 and/or called party telephony terminal 106 as described above in reference to wideband telephony system 100 of FIG. 1. As shown in FIG. 2, telephony terminal 200 includes a number of electrically interconnected components including a microphone 202, an ingress equalizer 204, signal processing logic 206, a telephony network interface 208, equalizer control logic 210, and a user interface 212. As will be appreciated by persons skilled in the relevant art(s), in some implementations, each of these components resides in and/or on the same device, while in other implementations (such as where telephony terminal 200 comprises a wireless handset with headset attachments), these components may be distributed among two or more devices.

Microphone 202 is configured to convert audio input, such as speech or other sounds, into an analog audio signal in a well-known manner. This analog audio signal may then be directly provided as an audio input signal to an ingress equalizer 204. In an alternate implementation, this analog audio signal may be converted into digital form by an analog-to-digital converter (not shown in FIG. 2) and provided as the audio input signal to ingress equalizer 204. Ingress equalizer 204 is configured to shape the audio input signal in accordance with one or more equalization parameters to produce a shaped audio signal. Ingress equalizer 204 is further configured to provide the shaped audio signal to signal processing logic 206. Signal processing logic 206 is configured to perform other signal processing functions necessary to support transmission of the shaped audio signal over a wideband telephony network. As will be appreciated by persons skilled in the relevant art(s), these functions may include, for example, encoding the shaped audio signal in accordance with a wideband compression/decompression (CODEC) algorithm and packetizing the encoded audio signal to produce a packetized wideband audio signal. Signal processing logic 206 is further configured to provide the packetized wideband audio signal to telephony network interface 208. Telephony network interface 208 is configured to convert the packetized wideband audio signal into an output audio signal suitable for transmission over a particular physical transmission medium and to transmit the output audio signal over the transmission medium. The transmission medium may include, for example, a wired or wireless transmission medium. Such transmission medium may be connected to or constitute part of the wideband telephony network.

User interface 212 is an interface that is configured to permit a user to interact with telephony terminal 200 for the purpose of placing and receiving telephone calls as well as to optionally perform other functions and obtain other services. In one embodiment, user interface 212 comprises a keypad and a display, although the invention is not so limited. In accordance with an embodiment of the present invention, user interface 212 is configured to allow a user to configure or select settings that control the manner in which ingress equalizer 204 will shape the digital or analog audio input signal received from microphone 202. In particular, user interface 212 is configured to accept user input that is used by equalizer control logic 210 to set one or more equalization parameters used by ingress equalizer 204 in performing the equalization function.

The user interface used to control the ingress equalizer may be implemented using a variety of user interface tools. For example, in one embodiment, the user may be presented with a menu of predefined equalizer settings and a means for selecting one of the predefined settings. In an alternate embodiment, the user may be presented with a series of sliders for boosting or cutting different bands or frequencies ranges of sound. However, these embodiments are provided by way of example only and are not intended to limit the present invention.

Telephony terminal 200 is thus configured to permit a user to adjust the audio input signal characteristics through control of ingress equalizer 204 prior to transmission. This feature is particularly useful if the called party's telephony terminal does not support such user-controlled adjustment of the received audio signal. This feature allows the user of telephony terminal 200 to select the best transmission setting for the benefit of the far-end listener.

Figure 3:
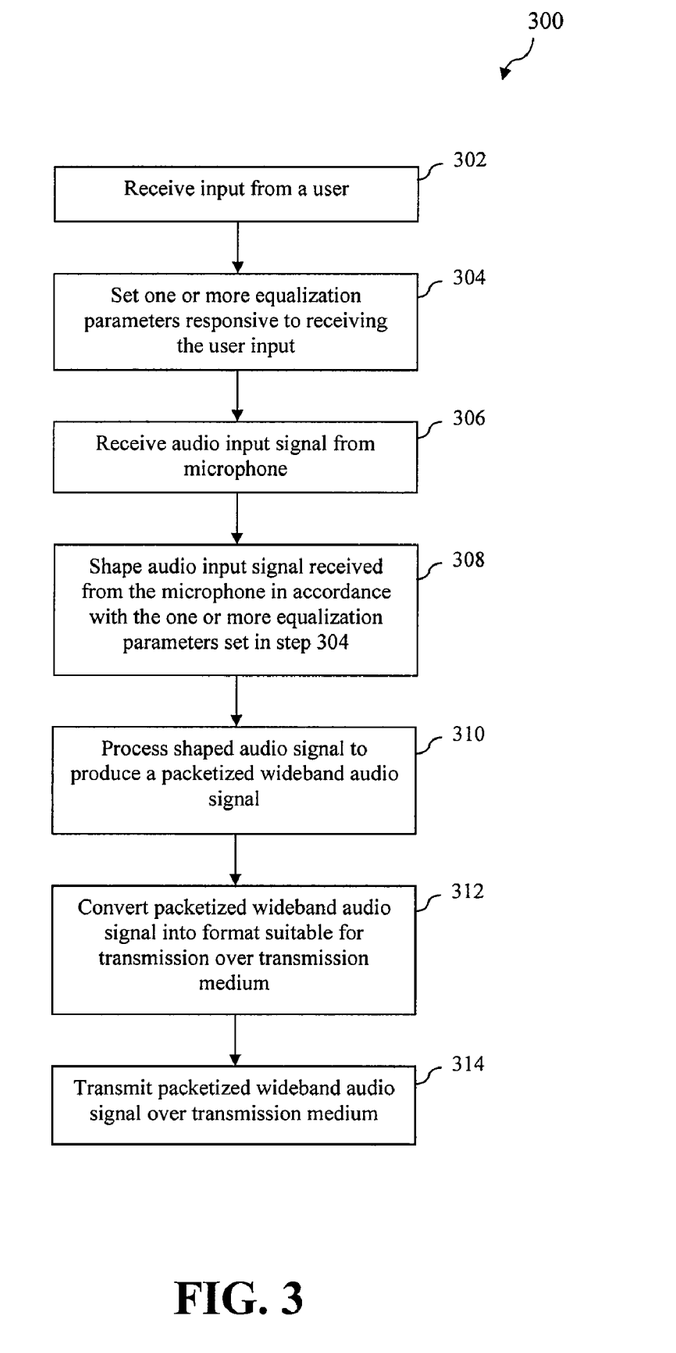
FIG. 3 depicts a flowchart of a method for providing user control of an ingress equalizer in a telephony terminal in accordance with an embodiment of the present invention.

FIG. 3 depicts a flowchart 300 of an example method for providing user control of an ingress equalizer in a telephony terminal in accordance with an embodiment of the present invention. The method of flowchart 300 will now be described with continued reference to telephony terminal 200 of FIG. 2, although the method is not limited to that implementation.

As shown in FIG. 3, the method of flowchart 300 begins at step 302 in which user interface 212 receives input from a user, wherein the user input relates to controlling ingress equalizer 204.

At step 304, equalizer control logic 210 sets one or more equalization parameters responsive to the receipt of the user input.

At step 306, an audio input signal is received from microphone 202. The audio input signal may be representative of speech or other audio input received by microphone 202. The audio input signal may be received in analog or digital form.

At step 308, ingress equalizer 204 shapes the audio input signal received from microphone 202 in accordance with the one or more equalization parameters set in step 304.

At step 310, the shaped audio signal is processed by signal processing logic 206 to produce a packetized wideband audio signal.

At step 312, telephony network interface 208 converts the packetized wideband audio signal into a format suitable for transmission over a transmission medium. The transmission medium is either connected to or is part of a wideband telephony network.

At step 314, telephony network interface 208 transmits the packetized wideband audio signal over the transmission medium.

Depending upon the implementation, in the foregoing method of flowchart 300, steps 302 and 304 of receiving user input and setting one or more equalization parameters responsive to receiving the user input may occur when telephony terminal 200 is not connected to another terminal, during a call setup period in which a telephone call is being established between telephony terminal 200 and another telephony terminal, and/or after call setup has occurred and an active telephone call is occurring between telephony terminal 200 and another telephony terminal.

2. User Control of the Egress Equalizer

Figure 4:
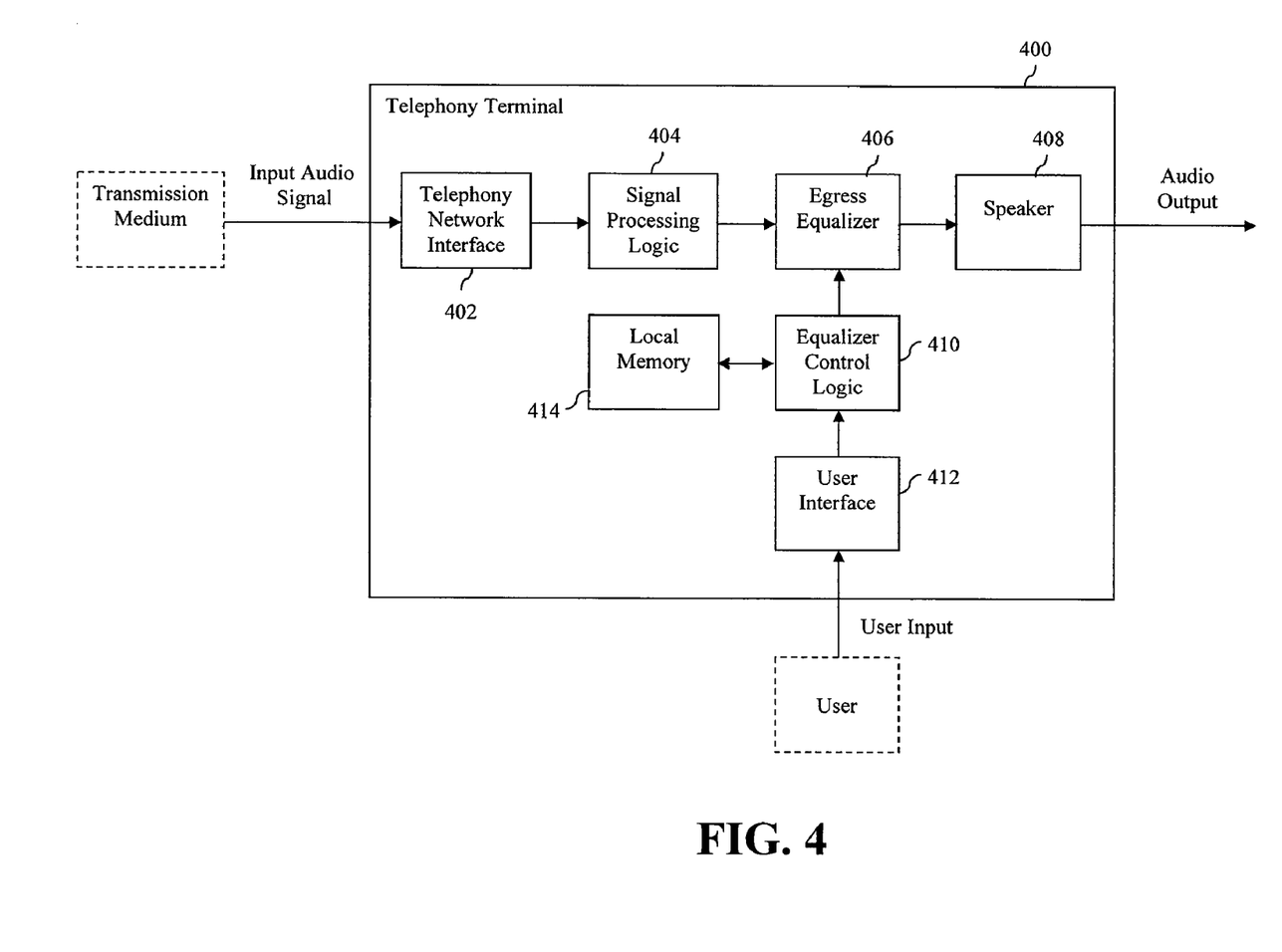
FIG. 4 is a block diagram of a telephony terminal that facilitates user control of an egress equalizer in accordance with an embodiment of the present invention.

FIG. 4 is a block diagram of a telephony terminal 400 that facilitates user control of an egress equalizer in accordance with an embodiment of the present invention. Telephony terminal 400 may be used, for example, to implement calling party telephony terminal 102 and/or called party telephony terminal 106 as described above in reference to wideband telephony system 100 of FIG. 1. As shown in FIG. 4, telephony terminal 400 includes a number of electrically interconnected components including a telephony network interface 402, signal processing logic 404, an egress equalizer 406, a speaker 408, equalizer control logic 410, and a user interface 412. As will be appreciated by persons skilled in the relevant art(s), in some implementations, each of these components resides in and/or on the same device, while in other implementations (such as where telephony terminal 400 comprises a wireless handset with headset attachments), these components may be distributed among multiple devices.

Telephony network interface 402 is configured to receive a packetized wideband audio signal from a transmission medium. The transmission medium may include, for example, a wired or wireless transmission medium. Such transmission medium may be connected to or constitute part of a wideband telephony network. Telephony network interface 402 is further configured to convert the packetized wideband audio signal into a format suitable for processing and to provide the packetized wideband audio signal to signal processing logic 404. Signal processing logic 404 is configured to perform signal processing functions necessary to convert the packetized wideband audio signal to a digital audio signal. As will be appreciated by persons skilled in the relevant art(s), these functions may include, for example, de-packetizing the packetized wideband audio signal and decoding the de-packetized wideband audio signal in accordance with a wideband CODEC algorithm. Signal processing logic 404 is further configured to provide the digital audio signal as an input audio signal to egress equalizer 406. In an alternate implementation, this digital audio signal may be converted into analog form by a digital-to-analog converter (not shown in FIG. 4) and provided as the audio input signal to ingress equalizer 204. Egress equalizer 406 is configured to shape the audio input signal in accordance with one or more equalization parameters to produce a shaped audio signal. Speaker 408 is configured to play the shaped audio signal back to a user.

Like user interface 212 described above in reference to telephony terminal 200 of FIG. 2, user interface 412 is an interface that is configured to permit a user to interact with telephony terminal 400 for the purpose of placing and receiving telephone calls as well as to optionally perform other functions and obtain other services. In one embodiment, user interface 412 comprises a keypad and a display, although the invention is not so limited. In accordance with an embodiment of the present invention, user interface 412 is configured to allow a user to configure or select settings that control the manner in which egress equalizer 406 will shape the audio input signal received from signal processing logic 404. In particular, user interface 412 is configured to accept user input that is used by equalizer control logic 410 to set one or more equalization parameters used by egress equalizer 406 in performing the equalization function.

The user interface used to control the egress equalizer may be implemented using a variety of user interface tools. For example, in one embodiment, the user may be presented with a menu of predefined equalizer settings and a means for selecting one of the predefined settings. The user may also be provided with a means for modifying or overriding a selected one of the predefined settings. In an alternate embodiment, the user may be presented with a series of sliders for boosting or cutting different bands or frequencies ranges of sound. However, these embodiments are provided by way of example only and are not intended to limit the present invention.

Telephony terminal 400 is thus configured to permit a user to adjust the audio output signal characteristics through control of egress equalizer 406 prior to playback to a user. This feature advantageously allows a user of telephony terminal 400 to fine-tune the audio output to suit a personal preference or to compensate for ambient noise or other factors that may impact their perception of the audio output.

Figure 5:
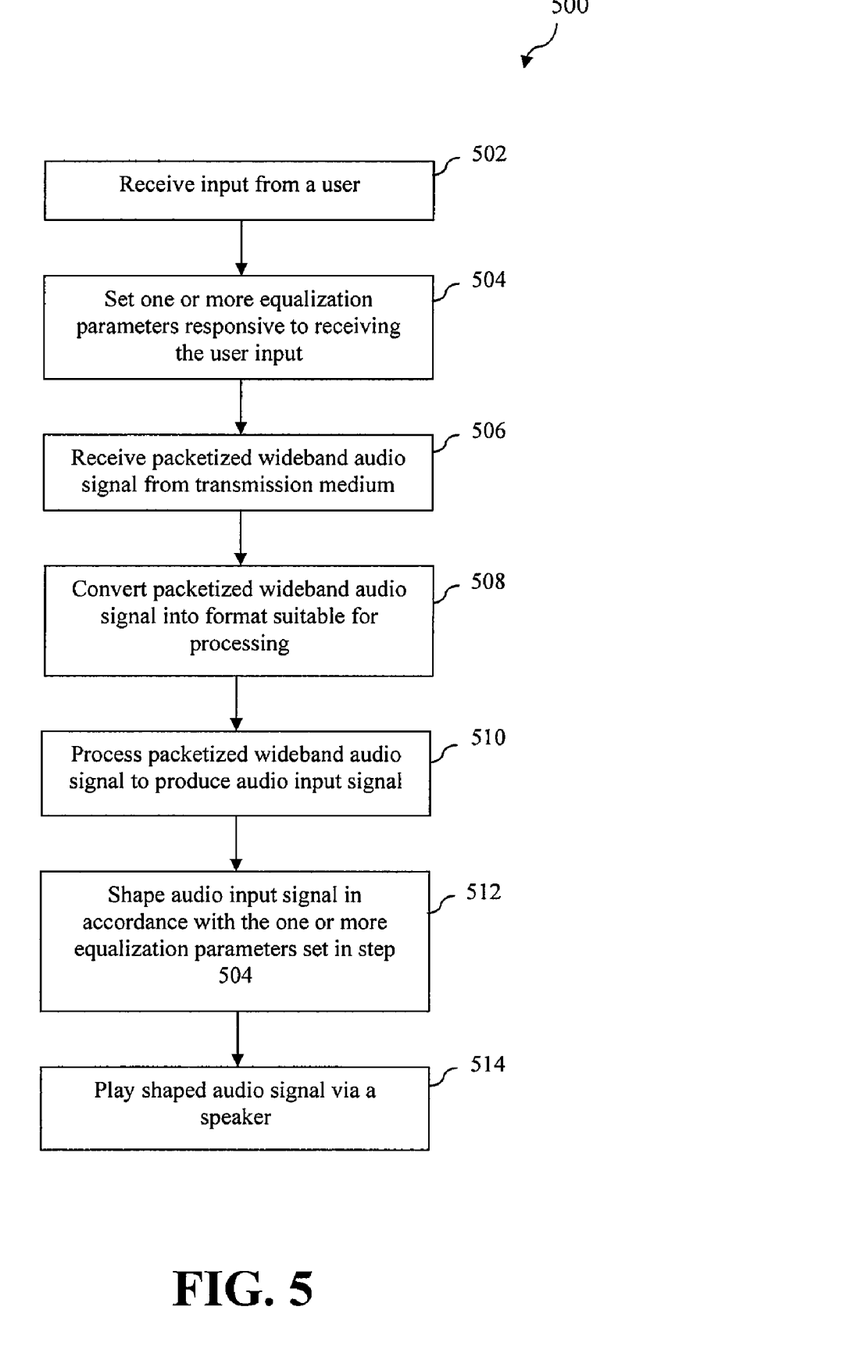
FIG. 5 depicts a flowchart of a method for providing user control of an egress equalizer in a telephony terminal in accordance with an embodiment of the present invention.

FIG. 5 depicts a flowchart 500 of an example method for providing user control of an egress equalizer in a telephony terminal in accordance with an embodiment of the present invention. The method of flowchart 500 will now be described with continued reference to telephony terminal 400 of FIG. 4, although the method is not limited to that implementation.

As shown in FIG. 5, the method of flowchart 500 begins at step 502 in which user interface 412 receives input from a user, wherein the user input relates to controlling egress equalizer 406.

At step 504, equalizer control logic 410 sets one or more equalization parameters responsive to the receipt of the user input.

At step 506, telephony network interface 402 receives a packetized wideband audio signal from a transmission medium. The transmission medium is either connected to or constitutes part of a wideband telephony network.

At step 508, telephony network interface 402 converts the packetized wideband audio signal from a format suitable for transmission over the transmission medium into a format suitable for processing.

At step 510, signal processing logic 404 processes the packetized wideband audio signal to produce an audio input signal therefrom.

At step 512, egress equalizer 406 shapes the audio input signal in accordance with the one or more equalization parameters set in step 504 to produce a shaped audio signal.

At step 514, the shaped audio signal is played back to a user via speaker 408.

Depending upon the implementation, in the foregoing method of flowchart 500, steps 502 and 504 of receiving user input and setting one or more equalization parameters responsive to receiving the user input may occur when telephony terminal 400 is not connected to another terminal, during a call setup period in which a telephone call is being established between telephony terminal 400 and another telephony terminal, and/or after call setup has occurred and an active telephone call is occurring between telephony terminal 400 and another telephony terminal.

As described above, telephony terminal 200 of FIG. 2 allows a user to control the performance of an ingress equalizer in shaping an audio signal received from a microphone while telephony terminal 400 of FIG. 4 allows a user to control the performance of an egress equalizer in shaping an audio signal received from a telephony network. Based on the foregoing description, persons skilled in the relevant art(s) will readily appreciate that the features of telephony terminal 200 and telephony terminal 400 may be combined to advantageously allow a user to control the performance of both an ingress equalizer and an egress equalizer in a single telephony terminal.

3. Association of Equalizer Settings with User Identifiers

In accordance with an embodiment of the present invention, equalizer settings may be associated with unique user identifiers, thereby enabling ingress and/or egress equalizer settings to be automatically determined during call setup based on the identity of the calling party and/or the called party. This feature will now be described in more detail with continued reference to telephony terminal 200 of FIG. 2 and telephony terminal 400 of FIG. 4.

As noted above, user interface 212 of telephony terminal 200 is configured to allow a user to configure or select settings that control the manner in which ingress equalizer 204 will shape the audio input signal received from microphone 202. In particular, user interface 212 is configured to accept user input that is used by equalizer control logic 210 to set one or more equalization parameters used by ingress equalizer 204 in performing the equalization function. In accordance with a further embodiment of the present invention, user interface 212 is also configured to accept user input that causes equalizer control logic 210 to associate the one or more equalization parameters with a unique user identifier.

In further accordance with this embodiment, equalizer control logic 210 is also configured to store the one or more equalization parameters in association with the unique user identifier in a local memory 214. For example, local memory 214 may be used to store a table of unique user identifiers and associated equalization parameters.

Equalizer control logic 210 may be still further configured to access the local memory 214 during call setup to compare an identifier associated with the local caller to the stored unique identifiers. The identifier associated with the local caller may either be a calling party identifier or a called party identifier depending on whether or not the local caller initiated the call. Such calling/called party identifiers may be made available, for example, through provisioning, through call signaling mechanisms such as content in signaling messages, or through some other mechanism. If equalizer control logic 210 determines that the identifier associated with the local caller matches one of the stored unique identifiers, it will automatically apply the equalization parameters associated with the matching unique identifier to ingress equalizer 204. Persons skilled in the relevant art(s) will readily appreciate that this embodiment can be used to store multiple ingress equalizer profiles corresponding to different local users of telephony terminal 200.

In one embodiment, if equalizer control logic 210 determines that the identifier associated with the local caller does not match one of the stored unique identifiers, it automatically applies default equalization parameters to ingress equalizer 204. In a further embodiment, user interface 212 provides a means for altering or overriding the automatically-applied equalization parameters regardless of whether those parameters are associated with a local caller or if they constitute default parameters.

An implementation of telephony terminal 400 of FIG. 4 may also support the association of equalizer settings with unique user identifiers. As noted above, user interface 412 of telephony terminal 400 is configured to allow a user to configure or select settings that control the manner in which egress equalizer 406 will shape the audio input signal received from signal processing logic 404. In particular, user interface 412 is configured to accept user input that is used by equalizer control logic 410 to set one or more equalization parameters used by egress equalizer 406 in performing the equalization function. In accordance with a further embodiment of the present invention, user interface 412 is also configured to accept user input that causes equalizer control logic 410 to associate the one or more equalization parameters with a unique user identifier.

In further accordance with this embodiment, equalizer control logic 410 is also configured to store the one or more equalization parameters in association with the unique user identifier in a local memory 414. For example, local memory 414 may be used to store a table of unique user identifiers and associated equalization parameters.

Equalizer control logic 410 may be still further configured to access the local memory 414 during call setup to compare an identifier associated with the remote caller to the stored unique identifiers. The identifier associated with the remote caller may either be a calling party identifier or a called party identifier depending on whether or not the remote caller initiated the call. Such calling/called party identifiers may be made available, for example, through provisioning, through call signaling mechanisms such as content in signaling messages, or through some other mechanism. If equalizer control logic 410 determines that the identifier associated with the remote caller matches one of the stored unique identifiers, it will apply the equalization parameters associated with the matching unique identifier to egress equalizer 406. Persons skilled in the relevant art(s) will readily appreciate that this embodiment can be used to store multiple egress equalizer profiles corresponding to different remote callers.

In one embodiment, if equalizer control logic 410 determines that the identifier associated with the remote caller does not match one of the stored unique identifiers, it automatically applies default equalizer parameters to egress equalizer 406. In a further embodiment, user interface 412 provides a means for altering or overriding the automatically-applied equalization parameters regardless of whether those parameters are associated with a remote caller or if they constitute default parameters.

Figure 6:
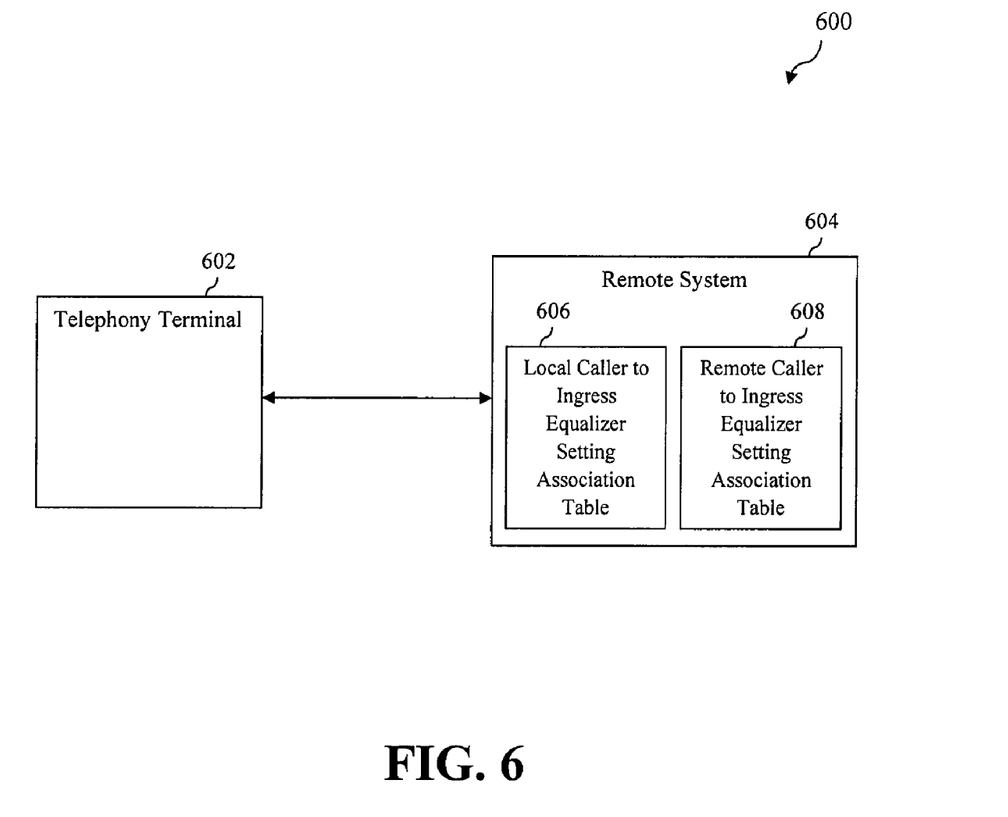
FIG. 6 is a block diagram of a system in which a telephony terminal uploads equalizer settings associated with local and remote callers to a remote system in accordance with an embodiment of the present invention.

In an alternate embodiment of the present invention, rather than storing equalizer settings and associated user identifiers locally, a telephony terminal uploads the equalizer settings and associated user identifiers to a remote system within the wideband telephony network. This is depicted in FIG. 6, which shows a system 600 that includes a telephony terminal 602 and a remote system 604. Telephony terminal 602 is configured to upload equalizer settings associated with local callers to a table 606 maintained by system 604 and to upload equalizer settings associated with remote callers to a table 608 maintained by system 604. During call setup, telephony terminal 602 accesses table 606 to obtain ingress equalizer settings based on the identity of the local caller, as determined from a calling or called party identifier. During call setup, telephony terminal 602 also accesses table 608 to obtain egress equalizer settings based on the identity of the remote caller, as determined from a calling or called party identifier.

Figure 7:
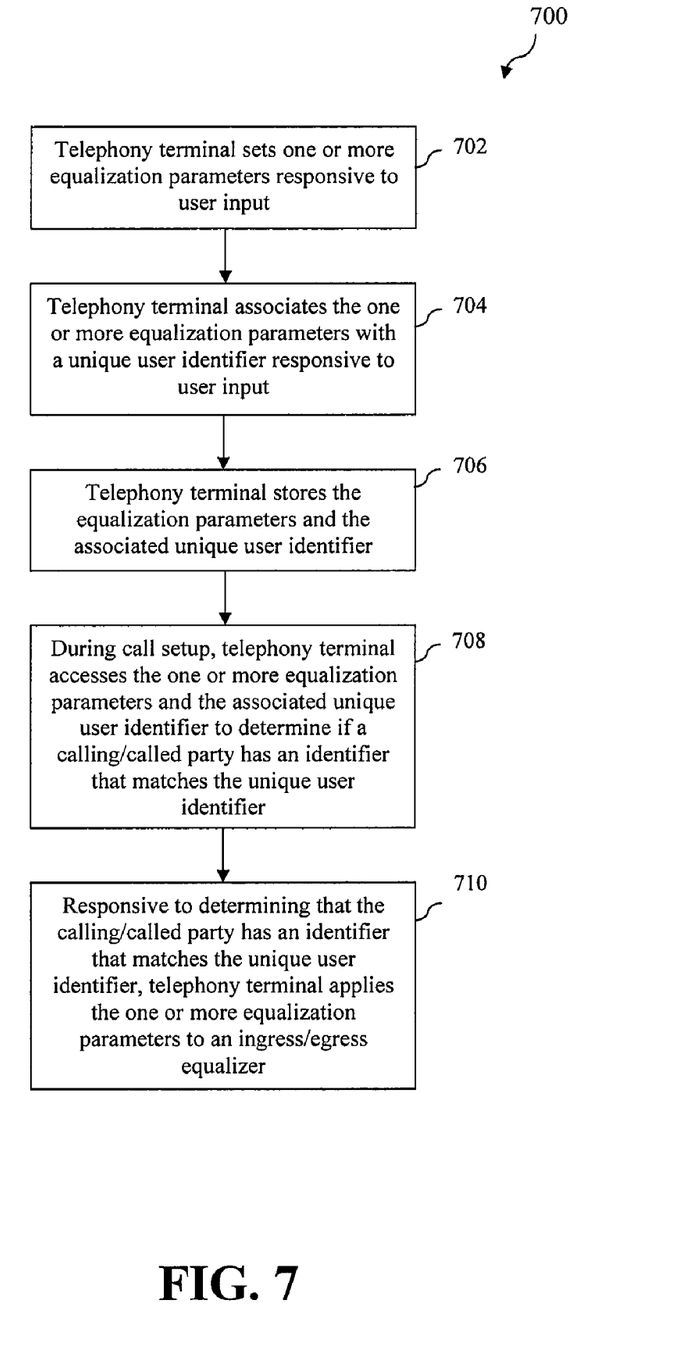
FIG. 7 depicts a flowchart of a method for automatically determining ingress and/or egress equalizer settings during call setup based on the identity of the calling party and/or the called party in accordance with an embodiment of the present invention.

FIG. 7 depicts a flowchart 700 of a general method 700 for automatically determining ingress and/or egress equalizer settings during call setup based on the identity of the calling party and/or the called party in accordance with an embodiment of the present invention.

As shown in FIG. 7, the method begins at step 702, in which a telephony terminal sets one or more equalization parameters responsive to user input. At step 704, the telephony terminal associates the one or more equalization parameters with a unique user identifier responsive to user input. At step 706, the telephony terminal stores the equalization parameters and the associated unique user identifier. This step may comprise storing the equalization parameters and the associated unique identifier in local memory or uploading the equalization parameters and the associated unique identifier to a remote system as described above.

At step 708, during call setup, the telephony terminal accesses the one or more equalization parameters and the associated unique user identifier to determine if a calling or called party has an identifier that matches the unique user identifier. At step 710, responsive to determining that the calling or called party has an identifier that matches the unique user identifier, the telephony terminal automatically applies the one or more equalization parameters to an ingress or egress equalizer within the telephony terminal.

C. Conclusion

Embodiments of the present invention may be implemented in hardware using analog and/or digital circuits, in software, through the execution of instructions by one or more general purpose or special-purpose processors, or as a combination of hardware and software. For example, various components of telephony terminal 200 of FIG. 2 (such as ingress equalizer 204, signal processing logic 206, equalizer control logic 210 and user interface 212) as well as various components of telephony terminal 400 of FIG. 4 (such as signal processing logic 404, egress equalizer 406, equalizer control logic 410 and user interface 412) may be implemented in hardware, software, or as a combination of hardware and software. Furthermore, one or more of the method steps of flowchart 300 of FIG. 3, flowchart 500 of FIG. 5 and flowchart 700 of FIG. 7 may be performed by hardware, software or a combination of hardware and software.

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for controlling equalization in a telephony terminal, comprising:
   receiving input from a user;
   setting one or more user-configurable equalization parameters responsive to receiving the user input;
   shaping an audio signal received by the telephony terminal from a remote telephony terminal based on the one or more user-configurable equalization parameters;
   storing the one or more user-configurable equalization parameters in association with a unique user identifier; and
   accessing, by equalizer control logic included in the telephony terminal, the one or more user-configurable equalization parameters and the associated unique user identifier during call setup to determine if a party to whom a call is being placed from the telephony terminal has an identifier that matches the unique user identifier;
   wherein shaping the audio signal based on the one or more user-configurable equalization parameters comprises shaping the audio signal based on the one or more user-configurable equalization parameters responsive to determining that the party to whom the call is being placed from the telephony terminal has an identifier that matches the unique identifier.

2. The method of claim 1, further comprising:
   receiving the audio signal from a transmission medium; and
   playing the shaped audio signal by a speaker.

3. The method of claim 2, wherein the audio signal is a wideband audio signal and the transmission medium is connected to or constitutes part of a wideband telephony network.

4. The method of claim 1, wherein storing the one or more user-configurable equalization parameters in association with the unique user identifier comprises storing the one or more user-configurable equalization parameters and the associated unique user identifier in a local memory within the telephony terminal.

5. The method of claim 1, wherein storing the one or more user-configurable equalization parameters in association with the unique user identifier comprises uploading the one or more user-configurable equalization parameters and the associated unique user identifier to a remote system within a telephony network.

6. A telephony terminal, comprising:
   a user interface configured to receive input from a user;
   equalizer control logic configured to set one or more user-configurable equalization parameters responsive to receiving the user input, wherein the equalizer control logic is configured to store the one or more user-configurable equalization parameters in association with a unique user identifier and to access the one or more user-configurable equalization parameters and the associated unique user identifier during call setup to determine if a party to whom a call is being placed from the telephony terminal has an identifier that matches the unique user identifier; and
   an equalizer configured to shape an audio signal received by the telephony terminal from a remote telephony terminal based on the one or more user-configurable equalization parameters, wherein the equalizer is configured to shape the audio signal based on the one or more user-configurable equalization parameters responsive to a determination by the equalizer control logic that the party to whom the call is being placed from the telephony terminal has an identifier that matches the unique identifier.

7. The telephony terminal of claim 6, further comprising:
a telephony network interface configured to receive the audio signal from a transmission medium; and
a speaker configured to play the shaped audio signal.

8. The telephony terminal of claim 7, wherein the audio signal is a wideband audio signal and the transmission medium is connected to or constitutes part of a wideband telephony network.

9. The telephony terminal of claim 6,
wherein the equalizer is configured to shape the audio signal based on one or more default equalization parameters responsive to a determination by the equalizer control logic that the party to whom the call is being placed from the telephony terminal has an identifier that does not match any unique user identifiers.

10. The telephony terminal of claim 6, further comprising:
a memory;
wherein the equalizer control logic is configured to store the one or more user-configurable equalization parameters and the unique user identifier in the memory.

11. The telephony terminal of claim 6, wherein the equalizer control logic is configured to upload the one or more user-configurable equalization parameters and the associated unique user identifier to a remote system within a telephony network.

12. A telephony terminal, comprising:
a local memory configured to store one or more user-configurable equalization parameters in association with a unique user identifier; and
equalizer control logic configured to retrieve the one or more user-configurable equalization parameters and the associated unique user identifier from the local memory during call setup to determine if a party to whom a call is being placed from the telephony terminal has an identifier that matches the unique user identifier,
the telephony terminal configured to shape an audio signal received by the telephony terminal based on the one or more user-configurable equalization parameters responsive to a determination that the party to whom the call is being placed from the telephony terminal has an identifier that matches the unique identifier.

13. The telephony system of claim 12, wherein the shaped audio signal is played by a speaker.

14. The telephony system of claim 12, wherein the audio signal received by the telephony terminal is received from a telephony network.

15. A telephony system, comprising:
a network system configured to store one or more user-configurable equalization parameters in association with a unique user identifier; and
a telephony terminal, comprising
equalizer control logic configured to retrieve the one or more user-configurable equalization parameters and the associated unique user identifier from the network system during call setup to determine if a party to whom a call is being placed from the telephony terminal has an identifier that matches the unique user identifier,
the telephony terminal configured to shape an audio signal received by the telephony terminal based on the one or more user-configurable equalization parameters responsive to a determination that the party to whom a call is being placed from the telephony terminal has an identifier that matches the unique identifier.

16. The telephony system of claim 15, wherein the shaped audio signal is played by a speaker.

17. The telephony system of claim 15, wherein the audio signal received by the telephony terminal is received from a telephony network.

18. The method of claim 1, further comprising:
accessing, by the equalizer control logic included in the telephony terminal, the one or more user-configurable equalization parameters and the associated unique user identifier during call setup to determine if a party initiating a call to the telephony terminal from the remote telephony terminal has an identifier that matches the unique user identifier,
wherein shaping the audio signal based on the one or more user-configurable equalization parameters comprises shaping the audio signal based on the one or more user-configurable equalization parameters responsive to determining that the party initiating the call to the telephony terminal from the remote telephony terminal has an identifier that matches the unique identifier.

19. The telephony terminal of claim 6, wherein the equalizer control logic is further to access the one or more user-configurable equalization parameters and the associated unique user identifier during call setup to determine if a party initiating a call to the telephony terminal from the remote telephony terminal has an identifier that matches the unique user identifier, and
wherein the equalizer is configured to shape the audio signal based on the one or more user-configurable equalization parameters responsive to a determination by the equalizer control logic that the party initiating a call to the telephony terminal from the remote telephony terminal has an identifier that matches the unique identifier.

20. The telephony system of claim 12, wherein the equalizer control logic is further configured to retrieve the one or more user-configurable equalization parameters and the associated unique user identifier from the local memory during call setup to determine if a party initiating a call to the telephony terminal has an identifier that matches the unique user identifier,
the telephony terminal further configured to shape an audio signal received by the telephony terminal based on the one or more user-configurable equalization parameters responsive to a determination that the party initiating the call to the telephony terminal has an identifier that matches the unique identifier.

21. The telephony system of claim 15, wherein the equalizer control logic is further configured to retrieve the one or more user-configurable equalization parameters and the associated unique user identifier from the network system during call setup to determine if a party initiating a call to the telephony terminal from a remote telephony has an identifier that matches the unique user identifier,
the telephony terminal configured to shape an audio signal received by the telephony terminal based on the one or more user-configurable equalization parameters responsive to a determination that the party initiating the call to the telephony terminal from the remote telephony has an identifier that matches the unique identifier.

* * * * *